H. B. NORTON.
Potato-Digger.

No. 70,108.

Patented Oct. 22, 1867

Witnesses:
Chas. P. Spencer
J. A. Davis

Inventor:
H. B. Norton
By J. Fraser & Co.
Attys.

United States Patent Office.

H. B. NORTON, OF ROCHESTER, NEW YORK.

Letters Patent No. 70,108, dated October 22, 1867.

IMPROVEMENT IN POTATO-DIGGER.

*The Schedule referred to in these Letters Patent and making part of the same.*

TO ALL WHOM IT MAY CONCERN:

Be it known that I, H. B. NORTON, of Rochester, in the county of Monroe, and State of New York, have invented a certain new and useful Improvement in Combined Machines for Planting, Cultivating, and Digging Potatoes; and I do hereby declare that the following is a full and exact description thereof, reference being had to the accompanying drawings, making part of this specification.

Figure 1:
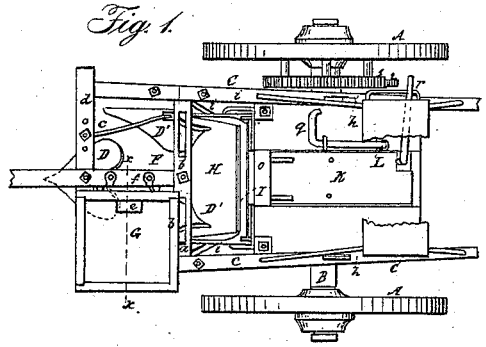

Figure 1 is a plan of my improved machine.

Figure 2:
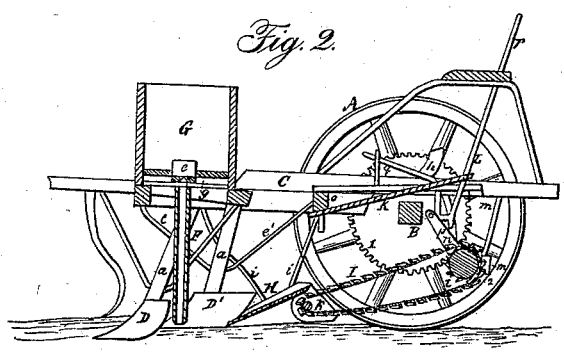

Figure 2, a vertical longitudinal section.

Figure 3:
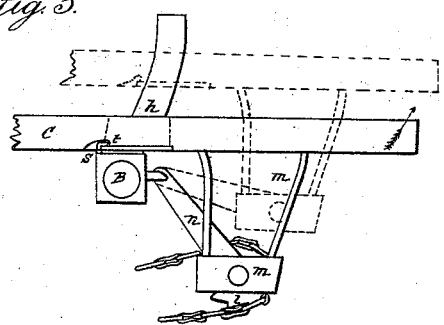

Figure 3, a diagram representing a rear elevation of the machine.

Figure 4:
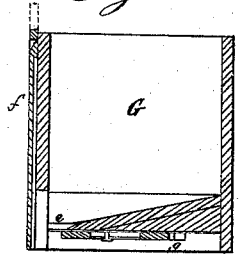

Figure 4, a vertical section of the seed-hopper in plane of line $x\ x$, fig. 1.

Like letters of reference indicate corresponding parts in all the figures.

This invention relates to an improvement in the seed-hopper, whereby the discharge is gauged to drop any given number of potatoes, and in the arrangement of the digging apparatus, whereby the gearing is expeditiously and effectually disengaged at any time.

As represented in the drawings, A A are the driving-wheels, B the axle, and C the main frame. In the front of the machine is secured a double mould-board point, D, and behind this two single mould-board points $D'\ D'$, turning inward. The double point opens the way in planting or digging, while the single points turn the furrows back again. The stocks $a\ a$ of the single points rest in slots $b\ b$ of the frame, which allow adjustment in and out so as to gauge the width of cut. Braces $c\ c'$, secured to the stocks, extend forward and backward and rest in any of a series of holes, $d\ d$, being secured by nuts. Directly in the rear of the point D a conducting tube, F, extends down from the main frame. Over this tube rests a seed-hopper, G, having a double-inclined bottom to direct the seed-potatoes to the discharge-opening $e$ over the spout. In front of the seed-opening is a vertical slide, $f$, and beneath the opening is a horizontal slide, $g$, adjusting forward and backward.

In planting the operator sits upon the machine in front of the hopper and raises the vertical slide $f$ at such a height as to feed the potatoes downward, as desired, but still not so as to allow them to escape outside. At the same time he adjusts the horizontal slide $g$ backward and forward, as occasion requires, to gauge the escape of the potatoes down the tube. By this arrangement it will be seen that the operator can control the throat of the hopper and feed the potatoes by hand exactly as desired. This gauge is exceedingly simple and effective, and produces that even distribution of the seed that is so difficult to accomplish in potato-planters.

Beneath the frame is suspended, by braces $i\ i$, a scraper or scoop, H, which receives the potatoes and dirt as they are thrown up by the point in front. In the rear of this scraper runs an endless apron, I, for carrying the potatoes back and discharging them in the rear. In front the apron runs around a shaft, $k$, while in the rear it passes over a driving-shaft, $l$, resting in hangers $m\ m$ from the frame. For heavy soils I prefer to make the apron of close lags, as in fig. 2, but for loose and sandy soils I prefer to use open rounds, as shown in fig. 3. The apron is driven by a pinion, 2, on the end of shaft $l$, gearing with cog-wheel 1 on the driving-wheel. The main frame, instead of being secured rigidly to the axle, as usual, simply rests loosely thereon, and is retained by curved arms $h\ h$ of the axle extending up through boxes in the side pieces of the frame. This arrangement allows the frame to rise when back pressure is applied. The shaft $l$ is connected by arms $n\ n$ with the axle, being jointed at both ends, as shown clearly in fig. 3, so that the apron can be raised with the frame. On top the axle rests a tread-lever or platform, K, the axle forming the fulcrum, while a cross-bar, $o$, of the frame forms the resistance. When the foot of the driver is pressed on the rear end of this lever or platform, the leverage over the axle will raise the main frame from the axle. When fully pressed down the rear end of the tread-lever or platform strikes under a bearing, $p$, of a lever, L. This lever has both a foot-rest, $q$, and a handle, $r$, as indicated, and it is provided with a suitable spring to retain its position to catch the platform. When not elevated the frame is held down to the axle by a catch, $s$, of the latter, which strikes over a lug, $t$, of the former, as clearly indicated in fig. 3.

The great advantage of the arrangement above described consists in the facility and ease with which the gearing can be disengaged. To accomplish this it is only necessary to back the team sufficiently to disconnect the parts $s\ t$, when, applying the weight of the operator to the tread-lever or platform K, the main frame, and with it the apron, is raised, as indicated in red lines, fig. 3, thereby, of course, throwing the cog-wheel and pinion out of gear. At all times when going forward the frame will be held down closely to the axle by the catch arrangement *s t*. This means of connection and disconnection is very simple and effective, and much more easily accomplished than where a hand-lever is employed. In front of the machine is a vine-clearer, R, projecting down in such form as to open the vines over the hills and prevent catching and dragging on the forward points.

What I claim as my invention, and desire to secure by Letters Patent, is—

1. The combination and arrangement of the frame C, resting loosely on the axle, the guide-arms *h*, the jointed arms *n*, the endless apron I, and the levers K and L, the whole operating in the manner and for the purpose herein set forth.

2. The combination of the catch arrangement *s t* with the loose frame C and guide-arms *h*, operating as and for the purpose specified.

In witness whereof I have hereunto signed my name in the presence of two subscribing witnesses.

H. B. NORTON.

Witnesses:
    R. F. OSGOOD,
    J. A. DAVIS.